A. CHURCHWARD.
ELECTRIC LIGHTING AND BATTERY CHARGING SYSTEM FOR VEHICLES.
APPLICATION FILED JAN. 2, 1914.
1,152,878.  Patented Sept. 7, 1915.
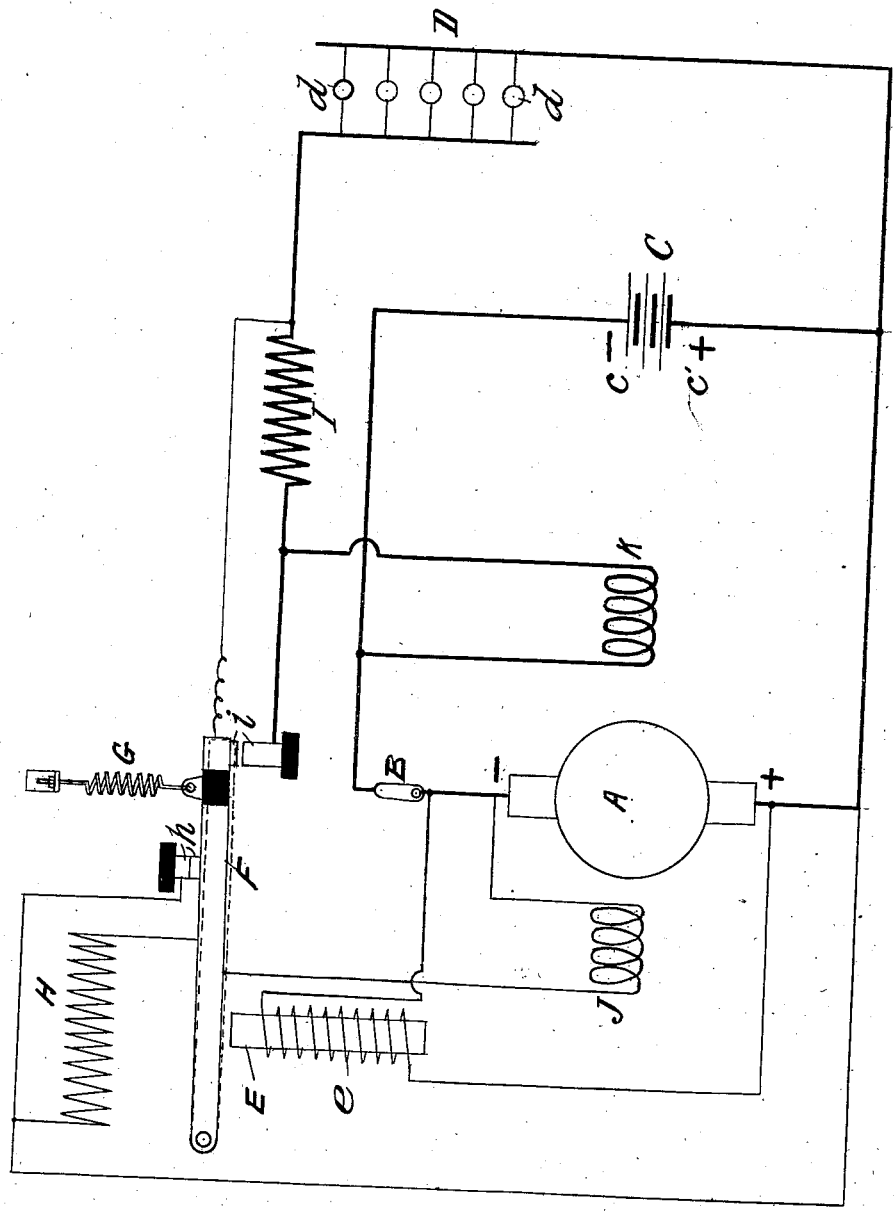

UNITED STATES PATENT OFFICE.

ALEXANDER CHURCHWARD, OF BOSTON, MASSACHUSETTS.

ELECTRIC-LIGHTING AND BATTERY-CHARGING SYSTEM FOR VEHICLES.

1,152,878.  Specification of Letters Patent.  Patented Sept. 7, 1915.

Application filed January 2, 1914. Serial No. 809,957.

*To all whom it may concern:*

Be it known that I, ALEXANDER CHURCHWARD, a citizen of the United States, residing at Boston, in the county of Suffolk and State of Massachusetts, have invented certain new and useful Improvements in Electric-Lighting and Battery-Charging Systems for Vehicles, of which the following is a specification.

It is well known that a dynamo, forming part of a vehicle electric lighting system, charging a battery, and at the same time maintaining the lamp load, will under continuous daylight running conditions, such as touring during the spring, summer and autumn months, gas the battery badly, resulting in the evaporation of the electrolyte and causing the active material to become loosened and thrown out of the plates, thereby materially reducing the capacity of the battery in a short time.

I have demonstrated in the past that a system comprising a dynamo so wound that when charging a battery it is shunt wound, and having the characteristics necessary to charge a battery properly, that is, to deliver a large current when the battery is low, but which will taper off to a predetermined minimum as the battery reaches the fully charged state, is the only system whereby a battery is kept in perfect condition with minimum attention and cost of maintenance, the connections of the system being so arranged that when the lights are turned on the current goes through a series winding, making a compound wound (accumulative) machine when lighting, and still acting as a shunt machine charging the battery. However, changed conditions of service, such as the introduction of electric starters and their use on vehicles for business and professional service where many stops and starts are made, and severe winter service when more night running with lights on is done in proportion to day running without lights, has resulted in an insufficient charging of the battery when charged at the ordinary rate, and the remedy cannot consist in adjusting the regulator so as to give more current continuously, as the battery would be injured and the lamps be burned out if at any time a long run with few stops should be made. To provide for this deficiency or imperfection I have devised automatic means whereby a heavy current above the normal may be delivered to the battery when it is low and not gassing, but directly the counter electro-motive force of the battery has risen corresponding to the gassing point of the plates, the dynamo current is reduced to its normal.

The invention consists, first, in the addition to the system of a potential relay connected preferably across the generator terminals and adjusted to actuate when the gassing point of the battery is reached; secondly, in combining the relay with the system so that should a battery connection become broken the dynamo current will automatically be reduced to normal and the lamps be maintained uninjured; thirdly, in the addition of an iron wire ballast coil in series with the lamps when the battery is being charged at abnormal rate and which is short circuited when the battery charge is normal; and, finally, in certain novelties of construction and combinations of parts as herein set forth and claimed.

The accompanying drawing illustrates an example of the embodiment of the invention constructed and combined according to the best mode I have so far devised for the application of the principle.

Referring to the drawing, A designates a dynamo, and B a switch of any well known type serving to connect the dynamo with the battery C and work circuits D. A relay mechanism comprising the magnet E, armature F, spring G, and the short circuiting contacts $h$ and $i$, serve to control the excitation of the dynamo A, and thus to determine the charging rate of the battery C. At the stopping of the dynamo A its field resistance H is short circuited by relay contacts $h$, thus causing its field magnets, when started, to be excited up to or near saturation and its voltage to be raised above the normal; also the iron wire ballast resistance I is then in series with the work circuits D, to safeguard the lamps $d$ $d$ against the abnormal voltage. If, then, the voltage of battery C is low, it will be charged at a high and gradually diminishing rate until its gassing point is reached, at this point there occurs a sudden rise in the dynamo voltage due to the counter electro-motive force of gassing, which causes an increased current to flow through coil $e$ and the relay armature F to be pulled down into the position indicated by the dotted lines, thus short circuiting ballast I by contacts $i$ and inserting resistance H into series with the shunt field winding J, The dynamo then works with unsaturated fields and generates its normal voltage. The gassing counter electro-motive force then disappears and the charging of the battery continues at a low and diminishing rate until normal, after which the dynamo supplies only the work circuits D, and works with compound excitation to maintain constant voltage with varying load. When the speed of the dynamo is sufficiently lessened attendant upon the stopping of the driving engine the relay armature F will be released and pulled by spring G back into the position shown in full lines, thus again short circuiting resistance H and inserting series connecting ballast I as before. The circuit of the working current is then from $c$ through the lamps $d$ $d$ and then in series through the ballast I and the series coil K back to $c'$. The ballast I then serves to dim the lamps $d$ $d$ while used merely as warning signals during waiting periods, thus saving both the lamps and battery. The compounding coil K then serves to reinforce the residual field magnetism of dynamo A and insures prompt building up of its voltage when started. If now the driving engine is again started the charging cycle will be repeated as before, but if the charge of battery C is at or near normal it will immediately generate the necessary counter electro-motive force to actuate the relay mechanism and establish the normal running conditions.

It is thus seen that the battery C is promptly recharged when its charge is lowered during waiting periods, and that the steady charging rate can be made so low that gassing and consequent overheating of the battery, loss of electrolyte by evaporation, shedding of active material, etc., are entirely avoided, also, as the battery is at all times fully charged, it is always ready for emergency use, such as propelling the car by means of a starter out of a position of danger, should the engine fail from any cause.

I do not limit the scope of the claims to controlling the change of field magnetism by the insertion of a resistance, as any other method of control may be used.

What I claim as my invention is:

1. The combination with an intermittently operated dynamo having a resistance normally in series with its shunt field winding, and a storage battery connected therewith, and work circuits containing a normally short circuited series resistance connected with both the dynamo and battery, of means for simultaneously inserting the circuit resistance and short circuiting the shunt field resistance when the dynamo is stopped, and for again short circuiting the work circuit resistance and re-inserting the field resistance after the dynamo is started and the battery charge becomes normal.

2. The combination with an intermittently operated compound wound dynamo having a resistance normally in series with its shunt field winding, a storage battery connected therewith, and work circuits containing a normally short circuited series resistance connected with both the dynamo and battery, of means for simultaneously inserting the circuit resistance and short circuiting the shunt field resistance when the dynamo is stopped, and for again short circuiting the work circuit resistance and re-inserting the field resistance after the dynamo is started and the battery charge becomes normal.

3. The combination of a shunt wound dynamo, a resistance in series with its field, means for short circuiting the same so that the dynamo will produce an abnormal current up to a predetermined point governed by the battery condition, and means to automatically insert said resistance when the predetermined point has been reached, thereby making the dynamo produce its normal current only, said current tapering off as the battery charge continues at the lower rate.

4. The combination of a compound wound dynamo, a resistance in series with its shunt field, means for short circuiting the same so that the dynamo will produce an abnormal current up to a predetermined point governed by the battery condition, and means to automatically insert said resistance when the predetermined point has been reached, thereby making the dynamo produce its normal current only, said current tapering off as the battery charge continues at a lower rate, a series winding connected in series with the lamps or other load so arranged in relation with the shunt winding that it will compound the dynamo in its normal conditions (unsaturated fields), but will not tend to cause it to compound materially when running under abnormal conditions (saturated fields), thereby keeping the potential at the lamps approximately constant.

In testimony whereof I affix my signature in presence of two witnesses.

ALEXANDER CHURCHWARD.

Witnesses:
R. HOYT MOSES,
WILLIAM B. MOSES.